Oct. 31, 1939.    W. C. SECHRIST    2,177,909
MOTOR SPEED CONTROL
Filed Jan. 6, 1938    2 Sheets-Sheet 2
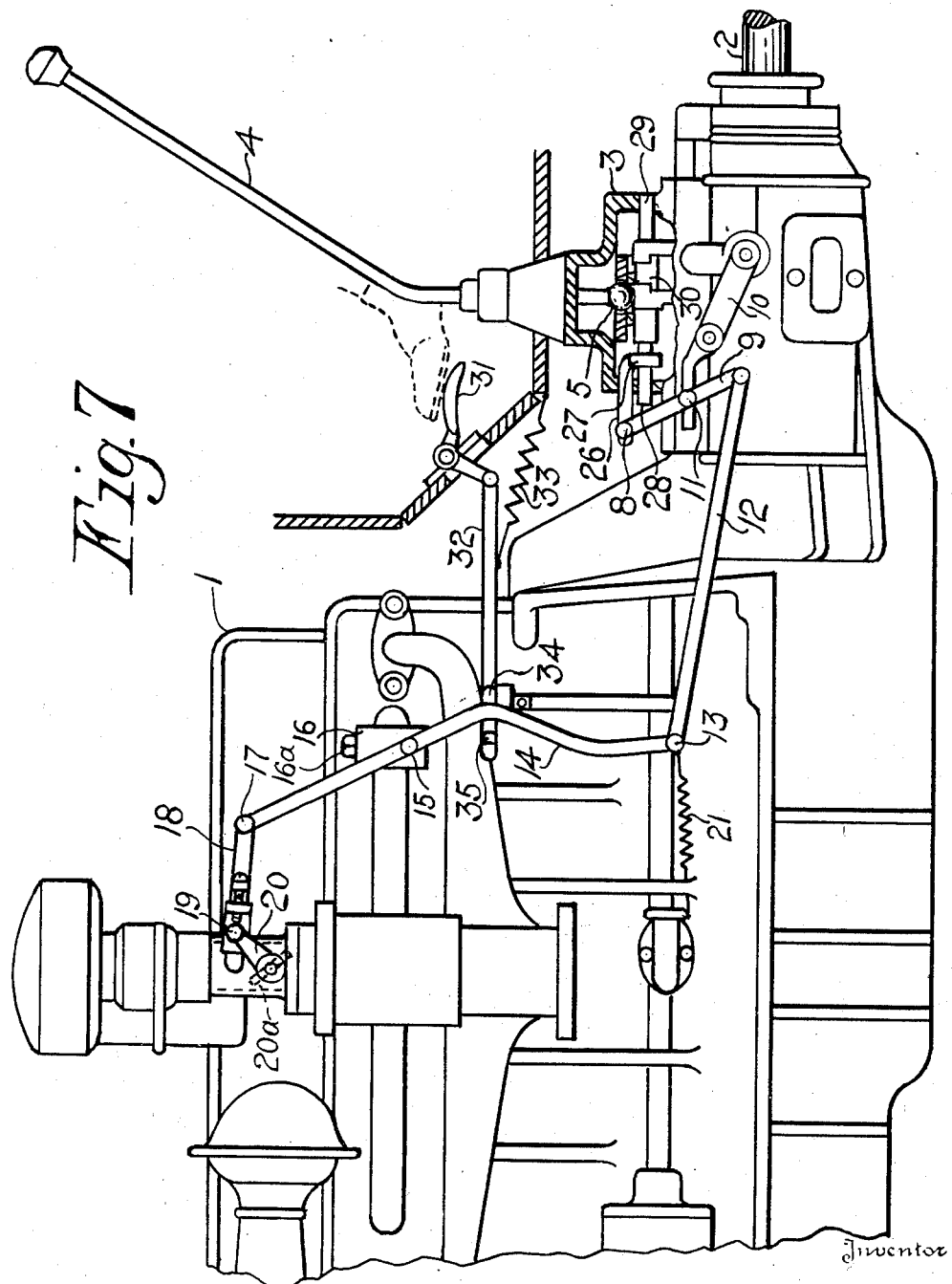
Inventor
William C. Sechrist,
By Edwin Guthrie,
Attorney Patented Oct. 31, 1939

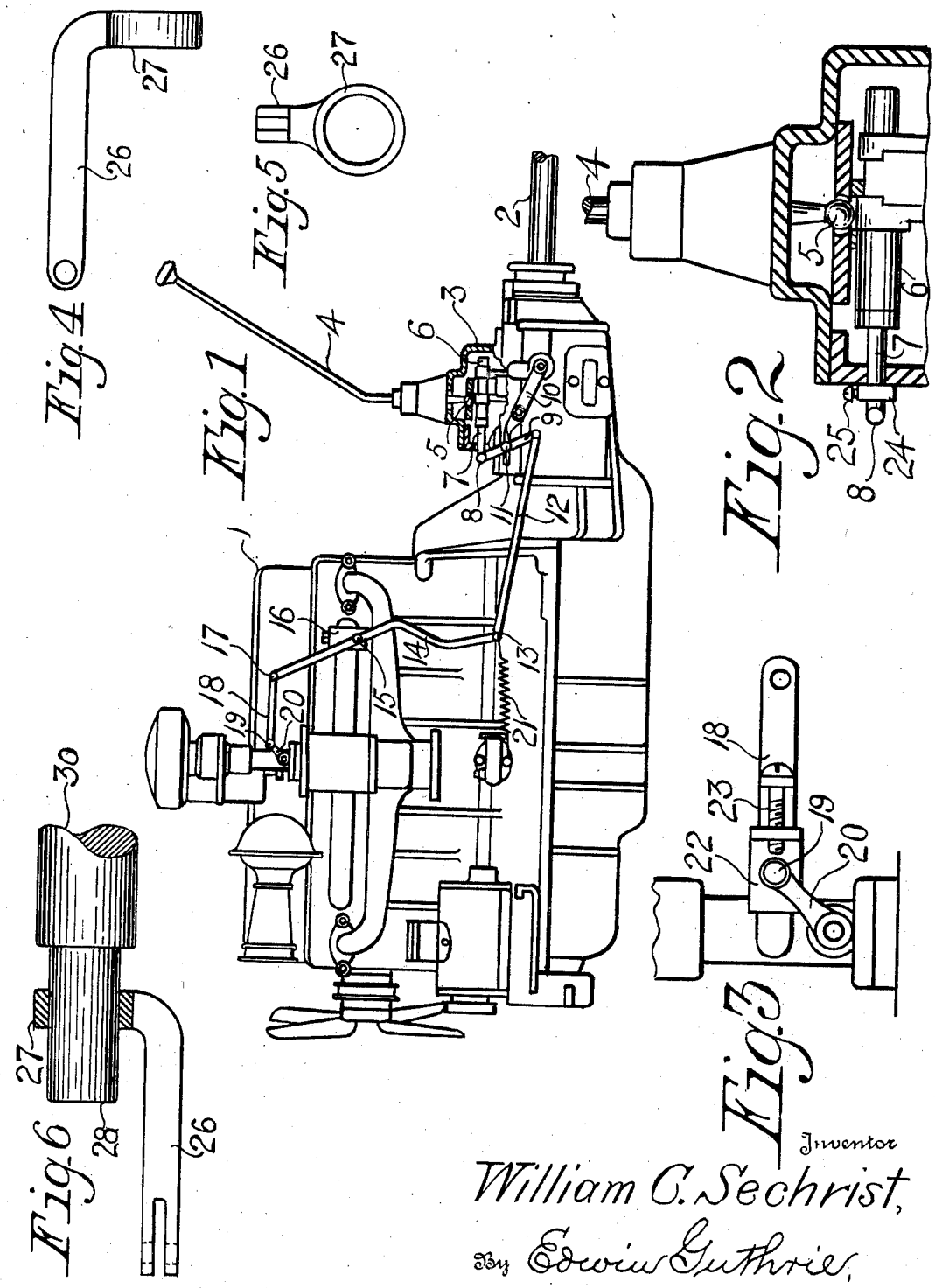

2,177,909

UNITED STATES PATENT OFFICE 2,177,909

MOTOR SPEED CONTROL

William C. Sechrist, Mont Alto, Pa.

Application January 6, 1938, Serial No. 183,734

2 Claims. (Cl. 74—472)

This invention relates to speed controls for gasoline motors. More particularly the invention is an automobile governing contrivance which operates only in connection with the high gear arrangement of the transmission. When the vehicle is in second or low gear it has any desired power which may be applied in the usual manner, and this invention does not then function and does not change the applied power in any way.

It is the object of this invention to provide a combination of parts of special construction and arrangement, which works from the transmission to the carbureter or fuel gas control valve. Certain coacting elements of this invention are connected with a member actuated only by the movements of the parts shifting the gears into the high gear relation. Other parts of the contrivances are attached to and control the amount of fuel gas delivered to the motor. This invention is adjustable and may be set for any desired speed in high gear. In practice, it has been the experience of this applicant that trucks generally are equipped with governors that prove to be unsatisfactory in use, due to the fact that there results a lack of power in low and second gear by reason of the governor not allowing enough gas to supply the required power. This invention has been found during a period of thorough trial to be unusually efficient when applied to trucks in general service.

The special construction and arrangement of the various parts of this invention are illustrated in the accompanying drawings, of which Fig. 1 represents a side view of a motor to the transmission mechanism of which this invention has been applied, all parts being assembled. The view is partly sectional through the transmission case.

Fig. 2 is a sectional view of the transmission case on a somewhat larger scale, showing one arrangement of the sliding member and shifting shaft of the transmission.

Fig. 3 illustrates one manner of adjustably connecting the end unit of the lever system with the gas fuel control valve of the motor.

Fig. 4 is a side view of the lever operating member, full size.

Fig. 5 is an end view of the member taken from the left hand end of Fig. 4.

Fig. 6 shows the member in sliding connection with the shifting shaft of the motor transmission.

Fig. 7 represents a side view of a motor as shown in Fig. 1, but somewhat enlarged, showing a conventional throttle valve with foot operated means for controlling the valve, with this invention applied.

Throughout the drawings and description the same number is used to refer to the same part.

Considering Figs. 1, 2 and 3 of the drawings, a motor 1 of any chosen structure, has the shaft 2 whereby the wheels of the vehicle may be driven. Operatively entering the transmission case 3 is the customary shift lever 4 having the ball end 5 adapted to shift the shifting shaft 6. At the end of the shaft is the part 7, termed for the purposes of this explanation a lever operating member. The stem of the member as shown passes out through the wall of the transmission case and has a pivotal connection 8 with an inclined lever 9. The lever is carried by the inclined supporting piece 10, to which it is pivoted by pivot pin 11. A connecting link 12 is attached by the pivot pin 13 to an upwardly extending lever 14 which has a fulcrum 15 carried by an attachment 16 secured to the motor. The attachment 16 is shown provided with a bolt 16a whereby its position may be adjusted, with the lever fulcrum 15. At its upper end the lever 14 joined by the pivot pin 17 with the terminal link or bar 18 of the system of levers and connections disclosed herein. A pivot pin 19 couples the link 18 with the control valve arm or crank 20, shown also in Fig. 3. In Fig. 1 will be noted a spring 21 connected with the motor at one end and with the pivot pin 13 at the other end. It will be noted that the contraction of the spring returns the levers and the member 7 into the positions from which they were moved by the operation of the shifter shaft into high gear.

Considering Fig. 3 there will be understood one means of adjusting the throw of the control valve arm 20. The plate 22 to which is connected the pivot pin 19 of the arm, has edges or flanges engaging the link 18 to which the plate 22 and, therefore, the end of arm 20 may be secured at any desired point of the end portion of the link, and the throw of the arm correspondingly varied in extent, by adjusting the screw 23.

Considering Fig. 2, there will be noted a stop block 24 having a set screw 25 by which the block is attached at any desired point to the stem of the movable member 7. The movement of the member inwardly with respect to the transmission case may thus be adjustably limited.

Figs. 4, 5 and 6 illustrate the usual form of the sliding lever operating member 26, having the same function as the member 7. The member 26 is made with an end ring portion 27, which engages and slides on the reduced end 27 of the shifting shaft 30, identical in purpose and operation with the shifting shaft 6 previously described.

Considering Fig. 7, a foot lever 31 may be provided to move the link rod 32 against the force of the return spring 33. Rod 32 has the lugs 34 and 35 that alternately engage and operate lever 14 and open and close the throttle valve 20a. When the shift lever 4 moves the gear shift shaft 30 to the left hand and into high gear position, the operator, when suitable adjustments have been made, cannot move rod 32 by foot to open the throttle valve further, as the end of the larger portion of the shifter shaft 30 is against the sliding ring portion 27 of the lever operating member 26.

In this invention it is not intended to limit the construction of the various parts to the particular forms illustrated and described, as such individual shapes may be readily modified. It is intended to disclose herein a special construction for a motor vehicle, operative only in high gear, believed to be superior in this respect, that when the car or truck is shifted into high gear the movement of the shifter shaft forces the mechanism of the speed control forward allowing the butterfly valve to open part way thus controlling the maximum speed. The amount depends on the maximum speed desired, and when the adjustment is set for the given speed, the adjusting screw can be sealed if necessary. The screw adjustment devices set out in Fig. 3 of the drawings may be modified in size and arrangement within the scope of this invention. A device may or may not be used to limit the movements of the parts in the direction opposite to that in effecting the high gear engagements, as the lever which is pivotally carried by the transmission case may be constructed and arranged to control the parts.

Having now described this invention and the manner of its use, I claim:

1. In motor control devices of the character described, a motor, transmission mechanism including a shift lever and a gear shifter shaft, a transmission case, said shifter shaft having an end portion of reduced diameter, a lever operating member having an arm passing outwardly through the wall of the case and a ring portion constructed and arranged to slide on the reduced end of the said shifter shaft, the end of the larger portion of said shaft being adapted to be brought into contact with the said ring portion thereby moving said member in one direction and limiting its movement in the opposite direction, a fuel gas control valve, a system of levers connecting the said arm of the member and said valve, foot operated means for opening and closing the said valve, and a spring constructed and arranged to hold the levers yieldingly in predetermined position.

2. In motor control devices of the character described, a motor, transmission mechanism and casing including a shift lever and a gear shift shaft, said shaft having an end portion of reduced diameter, a lever operating member having an arm passing outwardly through the wall of the casing and a ring portion constructed and arranged to slide on said reduced end of said shifter shaft, the end of the larger portion of said shaft being adapted to make contact with said ring thereby moving said member in one direction and limiting its movement in the opposite direction, a fuel gas control valve, a system of levers connecting the arm of the said member and said valve, means for adjusting the levers with respect to the movements thereof, foot operated means for actuating the levers independently with respect to the said member, and a spring constructed and arranged to hold the levers yieldingly in predetermined positions.

WILLIAM C. SECHRIST.